Aug. 1, 1967     H. J. JENSEN     3,334,306

VOLTAGE TRANSIENT SAMPLING CIRCUIT

Filed Sept. 28, 1964     2 Sheets-Sheet 1

INVENTOR.
Hartley J. Jensen
BY
Roland A. Anderson
Attorney

Aug. 1, 1967          H. J. JENSEN          3,334,306

VOLTAGE TRANSIENT SAMPLING CIRCUIT

Filed Sept. 28, 1964          2 Sheets-Sheet 2

INVENTOR.
Hartley J. Jensen
BY

Attorney

United States Patent Office 3,334,306
Patented Aug. 1, 1967

3,334,306
VOLTAGE TRANSIENT SAMPLING CIRCUIT
Hartley J. Jensen, Livermore, Calif., assignor, by mesne assignments, to the United States of America as represented by the United States Atomic Energy Commission
Filed Sept. 28, 1964, Ser. No. 399,940
6 Claims. (Cl. 328—151)

ABSTRACT OF THE DISCLOSURE

A circuit for sampling the amplitude of an unknown transient voltage pulse at preselected time intervals comprising a coaxial transmission line to one end of which is applied a transient voltage pulse of unknown waveform and to the other end in prescribed time relation to said unknown pulse a sampling pulse of known amplitude and duration. As the two pulses travel in opposite directions along the transmission line, the algebraic sum of their amplitudes may be sensed at preselected positions along the transmission line by suitable peak amplitude detection means.

---

This invention relates generally to a method and circuit means adapted to recover information concerning the waveform of an unknown non-recurrent, transient electrical pulse. More particularly, the invention is concerned with instrumentation for this purpose which samples the amplitude of a voltage pulse at predetermined time intervals and thereby provides data suitable for subsequent digital readout. The invention comprehends not only the general method and apparatus for developing the data, but also the detection and memory circuitry which is associated therewith.

It is fundamental that the accuracy of any complex functional representation in graphical form obtained by so-called curve smoothing improves in proportion to the number of functional values calculated and plotted. This technique may be applied in electronics where, by sampling, i.e., measuring the amplitude of an unknown voltage waveform at intervals over its total time span, a reconstruction of such waveform can be achieved. Various known waveform digitizing systems operate in accordance with this general method. All, however, are deficient in one respect or another. The present invention eliminates several of such deficiencies.

The accuracy of an electronic sampling technique is dependent not only on the number of samples taken and the time interval between samples, but also on the sample width or aperture, by which is meant the time during which a single measurement of pulse amplitude is being taken. If the sample aperture is relatively long compared to the total duration of the unknown pulse and its rate of change, serious errors may result. Obviously the sample aperture or "gating" time can never be zero, but if it can be shortened to a very small fraction of the total pulse time and if the sample interval can be made correspondingly short, the uncertainty introduced concerning the signal can be drastically reduced.

Accurate analysis by digital methods of a waveform of extremely short duration, for example, less than one microsecond, may require that samples be taken at intervals of a few nanoseconds ($10^{-9}$ seconds) apart along the waveform to be analyzed. Consequently, the sample aperture must be even smaller. Prior art sampling methods cannot successfully meet these narrow time requirements and, therefore, while these methods may be acceptable for analysis of longer pulses, they are inferior or unsuable for pulses of very short duration.

One reason for this weakness in existing sampling methods is the fact that they employ conventional gate circuits or AND circuits. Sampling may be accomplished by opening and closing a single gate or switch at predetermined intervals which permits the detection of pulse amplitude during the time the gate is open or by coding a pulse generator synchronized with a series of gate circuits spaced at intervals along the path of waveform propation. However, devices employing such gates have been relatively cumbersome in a time sense. In the first place, the gates must "turn on" and "turn off" again after a sample is taken in order to be ready to accept a succeeding sample or to limit the information received to the time the gate is open. This is an inherent weakness of gate circuits employing active electronic elements. Furthermore, digitizing systems employing such gates frequently encounter additional delays where the measurement of the unknown pulse amplitude is not made directly (see, for example, Baird, 3,056,049, wherein the sample pulse is applied to a delay line and a series of reflections in both directions takes place in proportion to the amplitude of the input). Such reflection time imposes a lower limit on the sampling time interval. The manner in which the sample aperture is established and controlled is fundamental to the present invention.

It is thus a general object of this invention to provide improved means for analyzing a voltage waveform whereby highly accurate digital information concerning its amplitude may be obtained.

It is a specific object of the invention to provide improved waveform analyzing means particularly adapted to obtaining accurate information concerning pulses of extremely short duration.

It is a yet more specific object of the invention to provide high speed pulse amplitude detection means which eliminate the need for gate circuits which must be "turned on" and subsequently "turned off."

In waveform analysis the requirements of information accuracy may dictate the adoption of selectively accurate data concerning different portions of a waveform; for example, the region of peak amplitude in the middle of a waveform may be of greater interest than its leading or trailing edge. In prior art techniques which require coding a sampling pulse generator, the coded pulses determine the repetition rate and sampling time of the gating circuits and thus selective variation of sample time intervals requires adjustment of complex circuitry.

It is a still further object, therefore, of the present invention to devise waveform analysis means wherein the accuracy of the data may be easily varied in accordance with a preselected information program.

A still further difficulty of prior art waveform analysis is concerned with the problem of proper synchronization of the sampling pulse code and the propagation of the unknown pulse. Clearly the precise timing of individual samples with respect to the propagation of the unknown pulse is of critical importance, and any errors of this nature may completely invalidate the results obtained. Substitution of a single sampling pulse for a series of coded pulses can greatly reduce the probability of cumulative timing errors.

It is yet another object of the invention, therefore, to provide means whereby the initiation of a single sample pulse and the sampling time intervals of a waveform analyzer are established in automatic time relation to the propagation of the unknown pulse.

In accordance with the teaching of the present invention, a voltage pulse of unknown waveform and a relatively narrow sampling pulse of known amplitude and duration initiated by such unknown pulse are applied at opposite ends of a coaxial transmission line in prescribed time relation and preferably with opposite polarity. The sample pulse is provided by a pulse generator which is triggered by the propagation of the unknown pulse to a selected intermediate position along the transmission line. Successive points on the unknown pulse waveform will be in coincidence with the sample pulse for very short periods of time measured by the sample pulse width as the two pulses travel in opposite directions, resulting in the algebraic summation of their amplitudes at successive positions along the line. These combined unknown and sample pulses may then be sensed in progression through taps spaced along the line to which suitable peak amplitude detection circuits may be individually connected. Preferably each detection circuit will include a plurality of series connected tunnel diodes which switch from their low to their high voltage states responsive to an input signal from the associated tap until a sufficient number of diodes have switched to equal the peak amplitude of such input signal. The diodes thereafter retain an indication of the peak amplitude so detected. If the data thus obtained is recovered by any suitable digital recording means, the actual amplitude values or ordinates along the unknown pulse waveform can be calculated by introducing a correction factor equal to the known amplitude of the sample pulse. The abscissa values will be directly proportional to the time intervals along the unknown curve corresponding to the spacing between successive taps. From a plot of these data a very accurate graphical reconstruction of the original waveform may be derived.

Additional objectives, features, and advantages of the present invention will be disclosed in the following detailed description and the accompanying drawings, wherein.

Figure 1:
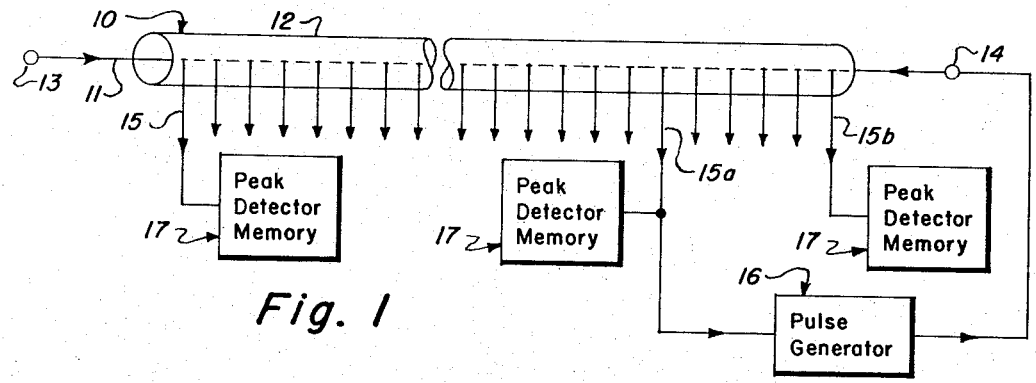
FIG. 1 is a block diagram of a circuit in accordance with this invention for sampling and recording information concerning a non-recurrent unknown voltage waveform.

Referring now to FIG. 1, there is shown a block diagram of a circuit and apparatus in accordance with this invention. Coaxial transmission line 10 of predetermined electrical length, having center conductor 11 and outer conductor 12, is provided with terminals 13 and 14 connected to opposing ends of center conductor 11. Transmission line 10 need not assume any specific axial orientation. For example, a helical arrangement has been found satisfactory. Spaced along transmission line 10 are a plurality of taps 15, each of which is connected directly to center conductor 11 through a hole in outer conductor 12 with suitable ground return means (not shown). The hole size can be experimentally adjusted to minimize reflections and energy loss in the line resulting from a non-uniform cross section. Taps 15 establish the sampling time intervals of the circuit and their spacing may be constant or varied in accordance with particular information accuracy requirements.

Any suitable means (not shown) may be employed whereby a non-recurrent pulse whose waveform is to be analyzed (i.e., the unknown pulse) may be applied to terminal 13 so that such pulse is enabled to propagate along transmission line 10 from left to right, as shown in FIG. 1. Conventional attenuation means (not shown) may be incorporated at the righthand end of transmission line 10 to prevent reflections of the unknown pulse. As the leading edge of the unknown pulse reaches preselected intermediate tap 15a, it provides a signal input to pulse generator 16 which is connected between tap 15a and terminal 14. In response to such signal, pulse generator 16 generates a single square wave sample pulse of known amplitude and duration, which is applied to transmission line 10 through terminal 14 and adapted to propagate from right to left in FIG. 1 so that it is seen at tap 15b prior to the arrival at such tap of the leading edge of the unknown pulse. As provided hereafter the sample pulse may be very narrow compared to the length of the unknown pulse. In the description to follow, for purposes of illustration, the unknown pulse is assumed to be positive and the sample pulse negative, although the reverse is acceptable. It is also possible to provide a sample pulse of the same polarity as that of the unknown pulse.

As the two pulses propagate in opposite directions, the algebraic sum of their amlitudes appears at successive taps 15 as the sample pulse arrives at each such tap. Each of taps 15 may now be connected separately to one of a plurality of similar peak detector memory circuits 17 which are responsive to the composite signals so obtained, and by means of which desired data concerning the amplitude of the unknown pulse can be stored for subsequent transmittal to any desired digital recording means.

Figure 2:
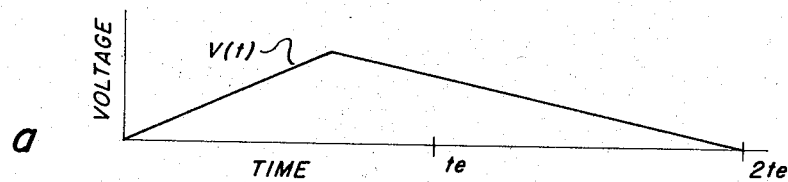
FIG. 2a illustrates any voltage-time function.
FIGS. 2b through 2h illustrate successive positions of a pulse corresponding to the voltage-time function of FIG. 2a and also, beginning with FIG. 2e, a narrow square wave pulse traveling in the opposite direction.

The manner in which the signals to be sensed at taps 15 are produced can be better understood by examination of FIGS. 2a through 2h. FIG. 2a illustrates any voltage-time function $V(t)$ having a total time duration of $2t_e$ where $t_e$ represents the electrical length of a transmission line along which a pulse corresponding to $V(t)$ may propagate. FIGS. 2b through 2h indicate various intermediate positions which may be assumed by such a pulse beginning at time $t_0$ and ending at time $2t_e$, with the arrows indicating the direction of propagation. These positions correspond to the physical positions that a pulse of form $V(t)$ will occupy as it propagates from left to right along a transmission line of length $t_e$. For purposes of illustration, the time intervals selected are each of value $t_e/3$.

In FIG. 2e at the righthand end of the axis of propagation there is shown a vertical line denoted $V_s$. This represents a narrow square-wave pulse introduced at the righthand end of a transmission line of electrical length $t_e$ simultaneously with the arrival at the same position of the leading edge of pulse $V(t)$. In successive FIGS. 2f, 2g, and 2h, pulse $V_s$ has progressed in time intervals of $t_e/3$ to the lefthand end of the axis of propagation while pulse $V(t)$ continues to move in the opposite direction. In FIG. 2h, the trailing edge of curve $V(t)$ has also reached the lefthand end of the axis while the leading edge of this curve has passed off scale to the right or, in other words, beyond the end of the transmission line. FIGS. 2b through 2h show that all points on curve $V(t)$ will be traced by line $V_s$ within time $t_e$. It is now clear that if a sample pulse is introduced at the righthand end of transmission line 10 in FIG. 1 substantially coincident with the arrival at the same end of the leading edge of an oppositely directed unknown pulse and if, in addition, transmission line 10 is at least half the electrical length of this unknown pulse, the sample pulse will "see," i.e., be successively in coincidence with, all points on the waveform of the unknown pulse during the propagation of the sample pulse to the lefthand end of transmission line 10. Therefore, in order to establish the proper electrical length for transmission line 10 in any given case, it is necessary only to know or to estimate the maximum duration of the unknown pulse to be measured.

Figure 3:
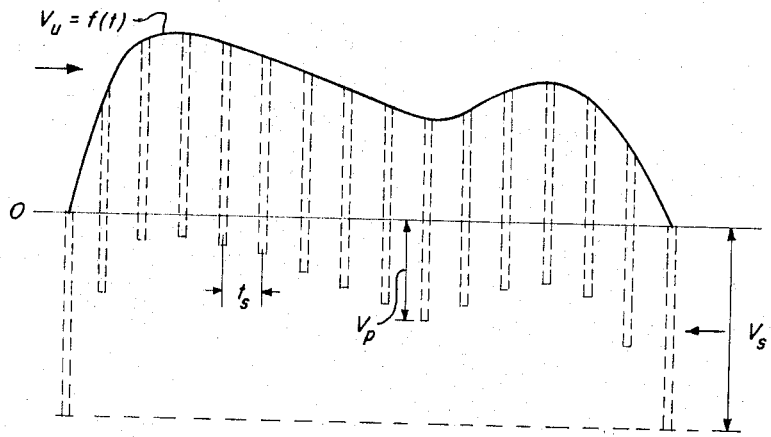
FIG. 3 illustrates a hypothetical unknown voltage waveform on a time axis with a sample pulse indicated at various positions relative thereto.

The manner in which an unknown pulse $V_u$ and a sample pulse $V_s$ may be superimposed on transmission line 10 to provide the combined signal to be sampled can be visualized more clearly in FIG. 3. As two such pulses move past each other in opposite directions, their instantaneous algebraic sum at intervals separated by time $t_s$ along pulse $V_u$ is represented by the series of vertical dashed outlines along the time axis. The full scale negative value of $V_s$ appears at the right and left-hand ends of the time axis where the value of $V_u=0$. The peak negative values, $V_p$, of intermediate positions of the summed pulses are seen to reproduce the waveform of $V_u$ offset on the voltage axis in a negative direction by the amplitude of $V_s$. As will be explained in more detail in connection with the detailed description of the operation of peak detector memory circuits 17, peak negative values $V_p$ are successively sensed as sample pulse $V_s$ passes each of taps 15. For proper operation of the preferred form of circuits 17, $V_s$ must be equal to or greater than $V_u$ at all times. The actual amplitudes of pulse $V_u$ plotted along a time axis at intervals $t_s$ can be obtained by taking the algebraic sum $V_p-V_s$ for each sample. It can easily be determined that the pulse propagation time between any two taps 15 will be half the time interval $t_s$ established thereby.

With reference again to FIG. 1, if an unknown pulse such as $V_u$ is applied to transmission line 10 in the manner described above, it is desirable to provide that a sample pulse such as $V_s$ will reach at least one of taps 15, for example, tap 15b, just ahead of the leading edge of the unknown pulse. This will insure that a suitable voltage reference is established from which the true amplitude of the unknown pulse may be calculated. The time required between initiation of pulse generator 16 at tap 15a and the arrival of the sample pulse at tap 15b must therefore be slightly less than the propagation time of the unknown pulse along transmission line 10 between the same two taps.

Since some small controllable finite voltage amplitude on the order of a volt will be required to initiate pulse generator 16, the leading edge of the unknown pulse at the time of initiation may be assumed to have progressed slightly beyond tap 15a. Clearly, if the operating time of pulse generator 16 is known, the only remaining variable is the position of tap 15a which may be in any desired relation timewise to tap 15b. By carefully balancing these factors a sufficient "lead time" for the sample pulse can thus be established.

An illustration of the actual values and time intervals involved in the circuit of this invention as described thus far may be furnished by assuming an unknown voltage pulse having a time duration of 800 nanoseconds. In order to reproduce the entire waveform of such a pulse, transmission line 10 must have an electrical length of at least 400 nanoseconds. The physical length of transmission line 10 corresponding to an electrical length of 400 nanoseconds can be calculated from the equation:

$$t_e = \frac{\text{length of transmission line in feet}}{\text{velocity of propagation in the transmission line}}$$

Assuming in a practical device that the speed of propagation of an electrical signal along a transmission line is .9 the speed of light and is independent of the geometry of the transmission line, the above equation establishes in the above example a transmission line length of 354 feet. Suppose further it is desired to provide equal sampling time intervals $t_s$ of 20 nanoseconds. A total of 40 equally spaced taps 15 separated from each other by an electrical length along transmission line 10 of 10 nanoseconds will establish the necessary sampling time intervals. Under these conditions a desirable "lead time" for the sample pulse may be chosen as 5 to 10 nanoseconds. If the known operating time of pulse generator 16 is 50 nanoseconds, then tap 15a may be separated from tap 15b by an electrical length of 60 nanoseconds or, in this case, 6 tap intervals.

A sample pulse may be developed by any one of various commercially available types of pulse generator, for example, Texas Instruments, Inc. Model 6701 of the avalanche transistor type. Such a generator can produce a square wave pulse of about 5 nanoseconds in width and may be initiated in response to signals of about 1 volt. It is also capable of generating a pulse and supplying it to transmission line 10 in about 50 nanoseconds. The device may be adjusted for greatest accuracy by imposing a test pulse at terminal 13 and connecting the input of pulse generator 16 to a selected tap 15a to observe if a full scale negative sample pulse is being developed only at tap 15b. A different tap 15a can be substituted if necessary to achieve this result. Alternatively, the delay introduced by pulse generator 16 may itself be adjusted.

Various types of circuitry known to the prior art may be employed for sensing and recording the peak negative values of $V_p$ as described and shown in FIG. 3. However, superior results are obtainable by the use of peak detector memory circuit 17, particularly where unknown pulses of extremely short duration are involved and short sampling time intervals are required. Any one of a plurality of such similar circuits 17, as shown in block form in FIG. 1, is shown schematically in FIG. 4. The input to peak detector memory circuit 17 is taken at any tap 15 which is connected to cathode 18 of current controlling diode 19. Anode 20 is connected to the junction between current limiting resistor 21 and an array of similar series connected tunnel diodes 22, the opposite end of this array being connected to ground. Diodes 22 are all oriented in a like sense, their polarity depending upon the signal to be detected at tap 15.

Figure 4:
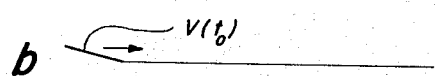
FIG. 4 is a schematic of a peak detector memory circuit in accordance with this invention showing its connection to a transmission line.
Figure 4:
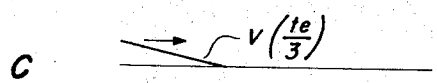
Figure 4:
Figure 4:
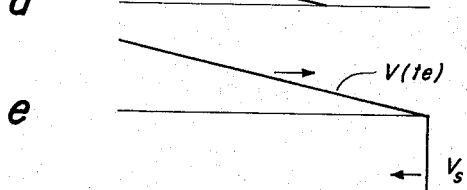
Figure 4:
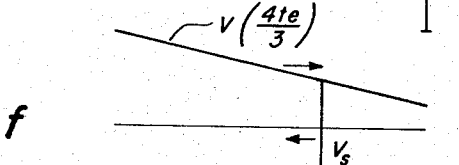
Figure 4:
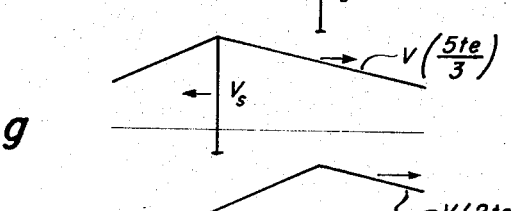
Figure 4:
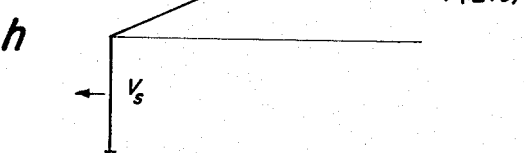
Figure 4:
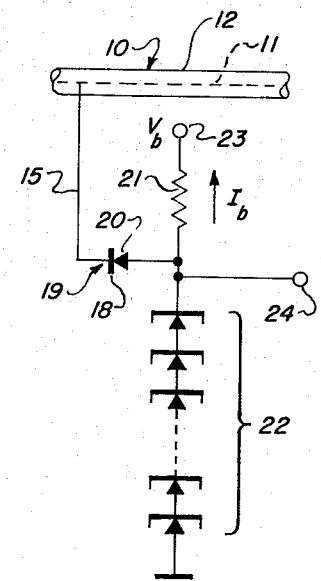

In FIG. 4, diode 19 and tunnel diodes 22 are illustrated to accept only negative-going pulses at tap 15. By reversing the polarity of diodes 22 and diode 19, the circuit may be made sensitive only to positive-going pulses. Current limiting resistor 21 is connected to negative biasing potential $V_b$ at terminal 23. $V_b$ and resistor 21 are selected such that a constant current source is provided for diodes 22 which is essential to proper circuit operation. Output terminal 24 of the circuit which is also connected to the junction between resistor 21 and series connected diodes 22 may in turn be attached to any suitable readout means such as a digital voltmeter or tape recorder.

Diode 19 serves a two-fold purpose. First of all, it provides isolation between bias potential $V_b$ and transmission line 10 whose characteristic impedance should be small compared to the combined impedance of tunnel diodes 22. Secondly, it prevents positive-going signals from affecting the voltage state of diodes 22 and thus destroying their memory.

Figure 5A:
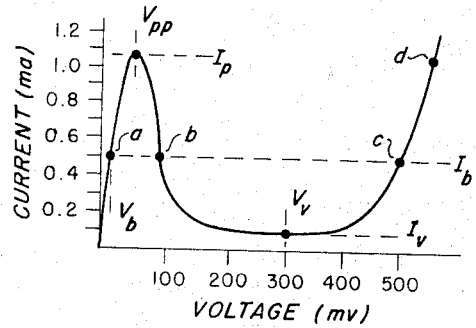
FIG. 5a illustrates a typical current-voltage characteristic curve for a single tunnel diode.

The operation of any one peak detector memory circuits 17 depends upon certain basic characteristics of tunnel diodes which will be briefly reviewed for purposes of clarification. FIG. 5a illustrates a typical forward voltage-current characteristic of a single tunnel diode. The diode is observed to have two stable operating states, a low voltage state occurring at point $a$ on the characteristic curve and a high voltage state occurring at point $c$. The horizontal load line connecting these points is established by a value of bias potential $V_b$ of relatively very high value and some correspondingly high load resistance such that a substantially constant bias current $I_b$ is applied which is less than the peak current $I_p$. The negative resistance portion of the characteristic between peak point voltage $V_{pp}$ and valley voltage $V_v$ is unstable so that a current-voltage combination lying in this region, for example, at point $b$, will tend to move toward a combination of current and voltage lying outside such region. If, for example, the diode together with associated external circuitry is operating at point $a$ under a bias current $I_b$ and a signal is applied such that in combination with $I_b$, the total current through the diode exceeds the value of peak current $I_p$, the diode will switch from operating point $a$ to operating point $c$. Any further increase in current across the diode will cause a temporary shift along the curve to point $d$. With change in polarity of applied signal voltages, this path is reversible. Note that in the low voltage state the voltage drop across the diode is only a few millivolts while in the high voltage state it is about 500 millivolts. As will be explained in more detail below, it is the voltage difference between these low and high voltage states which determines the voltage resolution obtainable with circuits 15.

Figure 5B:
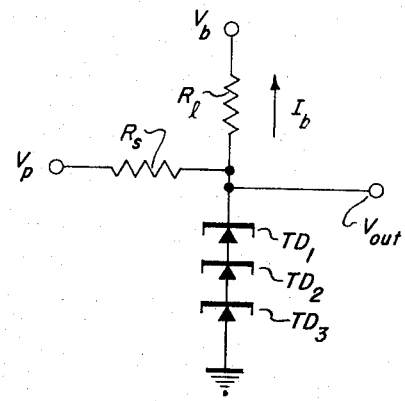
FIG. 5b is a simplified schematic of a tunnel diode switching circuit.

In FIG. 5b, a simple switching circuit is shown in schematic for further illustrative purposes incorporating three similar tunnel diodes $TD_1$, $TD_2$, and $TD_3$ in series and of like polarity connected through load resistor $R_1$ to a source of bias potential $V_b$ which produces a constant bias current $I_b$. $V_p$ represents the peak amplitude of a signal voltage which may be applied at the circuit input through effective source impedance $R_s$ while $V_{out}$ indicates the voltage amplitude which may be retained between the junction of the diodes and resistor $R_1$ to ground.

Figure 5C:
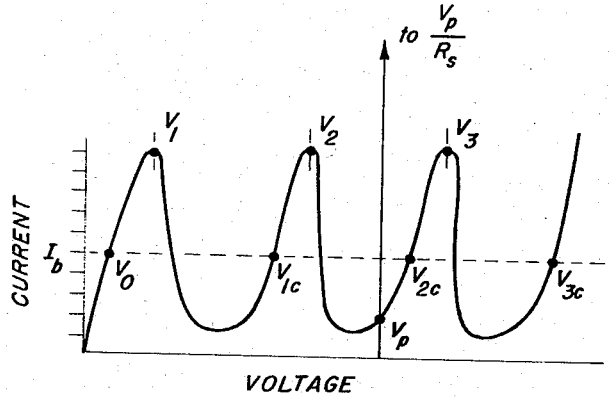
FIG. 5c illustrates a composite current-voltage characteristic curve for the series connected tunnel diodes shown in FIG. 5b.

The combined forward voltage current characteristic of the series diode circuit of FIG. 5b is illustrated in FIG. 5c. In the absence of a signal $V_p$, all three diodes $TD_1$, $TD_2$, and $TD_3$ will be biased initially in their respective low voltage states. Even though the tunnel diodes have similar characteristics, in actuality the value of $I_p$ will vary slightly among them so that the current value due to the signal $V_p$ necessary to switch each one will differ slightly. This is illustrated in FIG. 5c wherein the characteristics for the three diodes are arranged in order of the increasing peak currents corresponding to peak point voltages $V_1$, $V_2$, and $V_3$. As a signal $V_p$ is applied at the circuit input, it causes the value of bias current $I_b$ to be increased. The diode having the lowest $I_p$ will switch first from its low to its high voltage state, for example, from $V_0$ to $V_{1c}$, successive diodes thereafter switching in order of increasing $I_p$. In any given case, obviously the order shown in FIG. 5c may not be the actual physical sequence in which the diodes are arranged.

Assuming an input to the circuit of 5b from a voltage source (i.e., one which can supply infinite current) and assuming further that $V_p/R_s \gg I_p$, the voltage across the tunnel diodes will continue to rise as successive diodes switch from low to high voltage state until the input current is less than the difference between $I_b$ and the next higher value of $I_p$. A single valued operating point in the presence of $V_p$ is thus determined. This is shown by the intersection of the composite voltage current characteristics and the nearly vertical load line with X-axis intercept $V_p$ and Y-axis intercept $V_p/R_s$, a portion of which is shown for emphasis in extreme position in FIG. 5c. When the signal source is removed, the stable operating points $V_0$, $V_{1c}$, $V_{2c}$, and $V_{3c}$ will be determined by the substantially horizontal load line produced through $V_b$ where $V_b/R_1 < I_p$. If $V_1 < V_p < V_2$, the voltage present on the circuit after $V_p$ returns to zero is $V_{1c}$. If $V_2 < V_p < V_3$, the voltage will be $V_{2c}$ after $V_p$ returns to zero and, finally, if $V_p > V_3$, the voltage will be $V_{3c}$ after $V_p$ returns to zero. When $V_p = V_1$, $V_2$ or $V_3$, the unstable condition may resolve either toward a higher or a lower voltage.

The significance of the foregoing is to establish that such a circuit is capable of remembering whether $V_p$ exceeds $V_1$, $V_2$ or $V_3$, respectively. Thus it is clear that the true peak value of a transient signal $V_p$ will be measured and retained within less than .5 volt.

The theory of operation of circuit FIG. 5b can be applied to any number of such tunnel diodes connected in series as illustrated in the circuit of this invention, shown in FIG. 4. A peak negative voltage, $V_p$, determined by the operation of the overall circuit as described above in FIG. 3, is applied to any of peak detector memory circuits 17 through its associated tap 15. As each tunnel diode 22 switches it registers a potential of 0.5 volt. A sufficient number of tunnel diodes 22, initially in their low voltage states, will switch to their high voltage states to develop a potential from terminal 24 to ground which, within less than .5 volt, is equal to the peak negative voltage at tap 15. This potential is retained after $V_p$ has returned to zero.

It will be appreciated now with reference again to FIG. 3, that provided the sample pulse has been introduced at terminal 14 with sufficient lead time, the first of peak detector memories connected to tap 15b will retain a reading of the full scale amplitude of the negative sample pulse $V_s$. The peak negative values sensed at successive taps 15 by successive peak detector memory circuits 17 will be in accordance with the values $V_p$ as illustrated in FIG. 3. The reappearance of the full scale negative value of the sample pulse will indicate that the entire waveform of the unknown pulse has been scanned. The voltage amplitudes retained at terminal 24 of successive peak detector memory circuits 17 may now be transmitted to any appropriate digital readout devices from which the initial data can be recovered, as outlined above. The input impedance of the readout device should preferably exceed the equivalent resistance of the array of diodes 22 by a factor of 40 to 50 in order that the readout device may not influence the static operation of circuit 17 and thus affect retention of the proper memory.

A practical design for any of peak detector memory circuits 17 can now be illustrated. If the full scale negative value of $V_s$ is selected to be $-50$ volts, which, as we have seen, must be in excess of the estimated greatest positive amplitude of the unknown pulse, a convenient margin of safety may be provided by an array of 120 tunnel diodes 22 consisting, for example, of G.E. type 1N3712. Assuming a characteristic impedance of transmission line 10 of 50 ohms and a total input resistance for diodes 22 of 3000 ohms, other compatible elements and values may include the following:

Diode 19 _____ G.E. type 1N916
Resistor 21 _____ ohms__ $2 \times 10^6$
$V_b$ _____ volts__ $-1000$ It is now seen that the accuracy with which any of peak detector memory circuits 17 can measure the peak negative amplitude $V_p$ is governed by the voltage resolution capability of any of tunnel diodes 22. Assuming from FIG. 5a that for any given tunnel diode 22 $V_{pp} = 50$ millivolts and the corresponding high voltage state is at 500 millivolts, the positive error in voltage reading will be no greater than 0.45 volt. The corresponding maximum negative error will be less than .05 volt. If, in the above example, the circuit of this invention is being employed to analyze the waveform of an unknown voltage pulse of peak amplitude of 50 volts, the accuracy obtainable can be expressed as from $-0.1$ to $+1.0$ percent of full scale which, for pulses having a duration of less than $1\mu$ second, is better by a factor of 5 to 10 than results obtainable with any known prior art device. Obviously the total permissible range of the waveform analyzer becomes a function of the total number of tunnel diodes 22 employed in circuit 17 since each diode measures .5 volt. The switching time of a tunnel diode is about 0.5 nanosecond and the total switching time for an array of 120 such diodes has been experimentally verified to be less than 5 nanoseconds, so that a sample pulse of that width will be adequate to permit circuits 17 to operate in a practical situation.

It should be carefully noted that the operation of each memory circuit 17 is determined by the arrival of the leading edge of the sample pulse, that it automatically records the average value occurring during the sample pulse duration or aperture, and that when the sample pulse has departed, circuit 17 is automatically insensitive to further positive inputs. Since the peak negative input to circuit 17 occurs during the sample pulse aperture, it is likewise insensitive to all other possible negative pulses. It is clear also that once the sample pulse has been introduced at terminal 14, the time sequence of the sampling process and the consequent sample intervals $t_s$ are automatically determined by the known speed of propagation of the two pulses along the transmission line.

The waveform analyzer described herein takes unique advantage of the high speed switching capabilities of tunnel diodes in the analysis of extremely short transient pulses. Not only does the tunnel diode operate faster than other switching devices but the requirement of providing for both "turn on" time and "turn off" time within the sample aperture has been eliminated. The sample pulse $V_s$ thus automatically "turns on" each circuit 17 and no "turn off" is required.

Since the sampling process is accomplished by means of a single pulse triggered automatically by the unknown pulse, instead of through a series of coded pulses, the problem of synchronization is eliminated. The time interval between samples is solely a function of the fixed position of taps 15 along transmission line 10. To vary the information to be obtained concerning different portions of the unknown waveform it is only necessary to reselect the fixed positions of taps 15.

A modified form of the waveform analyzer of this invention may alternatively provide a sample pulse of like polarity to that of the unknown pulse. In such case conventional biasing means may be incorporated with peak detector memory circuits 17 to electronically clip the input signal so that no output is obtained until the amplitude exceeds the peak amplitude of the sample pulse. It should also be understood that for unknown pulses of duration greater than 1 microsecond the basic apparatus and method of the present invention can be employed with conventional sensing devices substituted for circuits 17 and connected to taps 15 by means of which the coincident unknown and sample pulse amplitudes can be successively detected and recorded.

It will be recognized by those skilled in the art that the foregoing description with the accompanying drawings is an explanation only of a preferred embodiment of the invention. Changes by way of substitution of equivalent components may be made without departing from the sphere and scope of the invention as claimed below.

What is claimed is:
1. A voltage transient sampling circuit comprising a coaxial transmission line,
means for applying to one end of said transmission line an unknown non-recurrent voltage pulse,
pulse generation means responsive to the propagation of said unknown voltage pulse whereby a sample pulse of predetermined amplitude and duration may be applied to the other end of said transmission line in timed relation to said unknown pulse and oppositely directed thereto,
a plurality of taps spaced along said transmission line at predetermined intervals,
means individually connected to said taps for successively detecting and recording the elgebraic sum of the peak amplitudes of the unknown pulse and sample pulse existing in coincidence at each of said taps.

2. A voltage transient sampling circuit as in claim 1 wherein said sample pulse is of opposite polarity to that of the unknown pulse and of an amplitude at least equal to the peak amplitude of the unknown pulse.

3. A voltage transient sampling circuit as in claim 1 wherein said transmission line has an electrical length equal to half of the time duration of the unknown pulse.

4. A voltage transient sampling circuit as in claim 1 wherein the spacing between successive taps is variable in accordance with a preselected information program.

5. A voltage transient sampling circuit as in claim 1 wherein said sample pulse is timed to reach at least one of said electrical taps before the arrival of the unknown pulse at said tap.

6. A voltage transient sampling circuit as in claim 1 wherein
the input of said pulse generation means is connected to a predetermined tap and the output of said pulse generation means is connected to the end of the transmission line at which the sample pulse is applied,
said pulse generation means being triggered in response to the existence at said tap of a preselected minimum amplitude of said unknown pulse.

References Cited
UNITED STATES PATENTS
3,105,197  9/1963  Aiken _____ 328—151 X
FOREIGN PATENTS
957,348  5/1964  Great Britain.

ARTHUR GAUSS, *Primary Examiner.*

D. D. FORRER, *Assistant Examiner.*